United States Patent [19]
Diener

[11] 3,747,969
[45] July 24, 1973

[54] ENERGY ABSORBING BUMPER MOUNT
[75] Inventor: James H. Diener, Lansing, Mich.
[73] Assignee: General Motors Corporation, Detroit, Mich.
[22] Filed: Feb. 25, 1971
[21] Appl. No.: 118,637

[52] U.S. Cl. ..................... 293/89, 188/1 B, 293/70
[51] Int. Cl. .......................................... B60r 19/04
[58] Field of Search ..................... 293/1, DIG. 3, 60, 293/70, 86, 89, 99, 101; 188/1 B, 1 C; 213/1 A

[56] References Cited
UNITED STATES PATENTS
| 2,837,176 | 6/1958 | Dropkin | 188/1 C |
| 3,203,723 | 8/1965 | Montenare | 293/89 |
| 1,413,283 | 4/1922 | McCracken | 293/89 |
| 3,432,200 | 3/1969 | Barton | 293/71 |
| 2,977,146 | 3/1961 | Edwards et al. | 293/60 |
| 3,671,068 | 6/1972 | Gerhard | 293/1 |

Primary Examiner—Gerald M. Forlenza
Assistant Examiner—Robert Saifer
Attorney—W. E. Finken and D. L. Ellis

[57] ABSTRACT

A vehicle collison bumper mount includes serially actuated primary and secondary energy absorbing units. The primary unit includes a strut rigidly projecting from a bumper bar and a friction pad operative to clamp the strut to the chassis frame, the strut being slidable relative to the chassis frame and the friction pad and against the uniform resistance of mechanical friction to effect primary energy absorption. The secondary unit includes a slidable contact member clamped to the chassis frame in spaced relation to the strut. After a predetermined amount of sliding movement during primary energy absorption the strut engages the contact member and forces the latter to slide as a unit therewith so that the frictional resistance to sliding of the contact member effects additional or secondary energy absorption.

1 Claim, 3 Drawing Figures

Patented July 24, 1973

3,747,969

INVENTOR.
James H. Diener
BY
D. L. Ellis
ATTORNEY

ENERGY ABSORBING BUMPER MOUNT

This invention relates generally to vehicle collision bumper structures and in particular to energy absorbing mounts therefor.

The primary feature of this invention is that it provides an improved vehicle collision bumper structure mount including a normally rigid primary energy absorbing unit which yields in an energy absorbing mode with corresponding bodily movement of the bumper structure relative to the vehicle body when the bumper structure is subjected to forces of extraordinary magnitude. Another feature of this invention is that it provides a bumper structure mount wherein a predetermined amount of relative bodily movement of the bumper structure during primary energy absorption triggers or actuates a secondary energy absorbing unit which thereupon effects additional or secondary energy absorption. Yet another feature of this invention is that it provides a bumper structure mount wherein both the primary and the secondary energy absorbing units are relatively easily reset in normal positions following an energy absorbing cycle of operation. Still another feature of this invention resides in the provision of a secondary energy absorbing unit of the mechanical friction type wherein a fixed abutment on one of the vehicle body and bumper structure engages, after a predetermined amount of relative bodily movement of the latter, a contact member movable relative to the other of the bumper structure and vehicle body against substantial mechanical friction so that relative bodily movement of the bumper structure subsequent to engagement initiates frictionally resisted movement of the contact member and consequent additional energy absorption. A still further feature of this invention is that it provides a bumper structure mount of the described type wherein the relative levels of primary and secondary energy absorption can be readily adjusted by altering the frictional resistance between the elements.

These and other features of this invention will be readily apparent from the following specification and from the drawings wherein.

Figure 1:
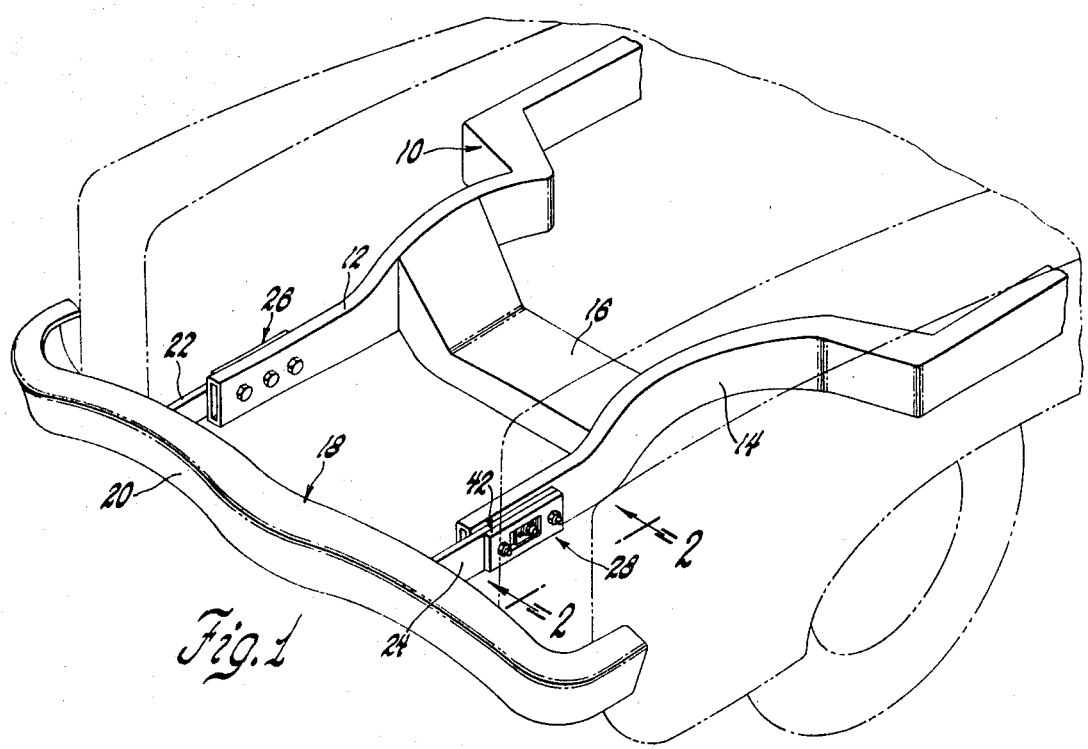
FIG. 1 is a perspective view of an automobile chassis frame having a collision bumper structure supported thereon by a pair of energy absorbing mounts according to this invention.

Referring now to FIG. 1 of the drawings, there is shown in simplified form an automobile chassis frame designated generally 10 including a box section left side frame rail 12 and a box section right side frame rail 14, the frame rails being interconnected generally at the forward end of the chassis frame by a rigid cross member 16. A collision bumper structure designated generally 18 including a bumper bar 20 having a pair of rigid struts 22 and 24 projecting therefrom is normally rigidly supported on the chassis frame by a pair of energy absorbing mounts according to this invention and designated generally 26 and 28. It will be understood, of course, that rather than the separate chassis frame illustrated herein, the energy absorbing mounts according to this invention are equally well adapted for use with unibody vehicle constructions.

Figure 2:
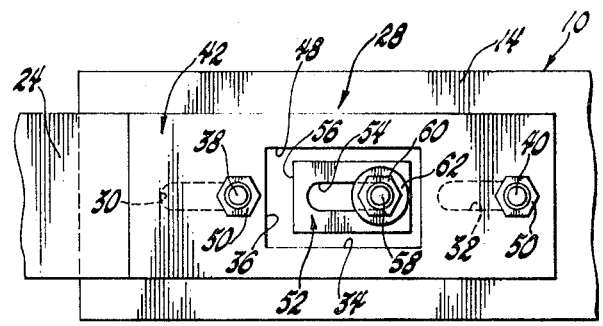
FIG. 2 is an enlarged view taken generally along the plane indicated by lines 2—2 in FIG. 1.
Figure 3:
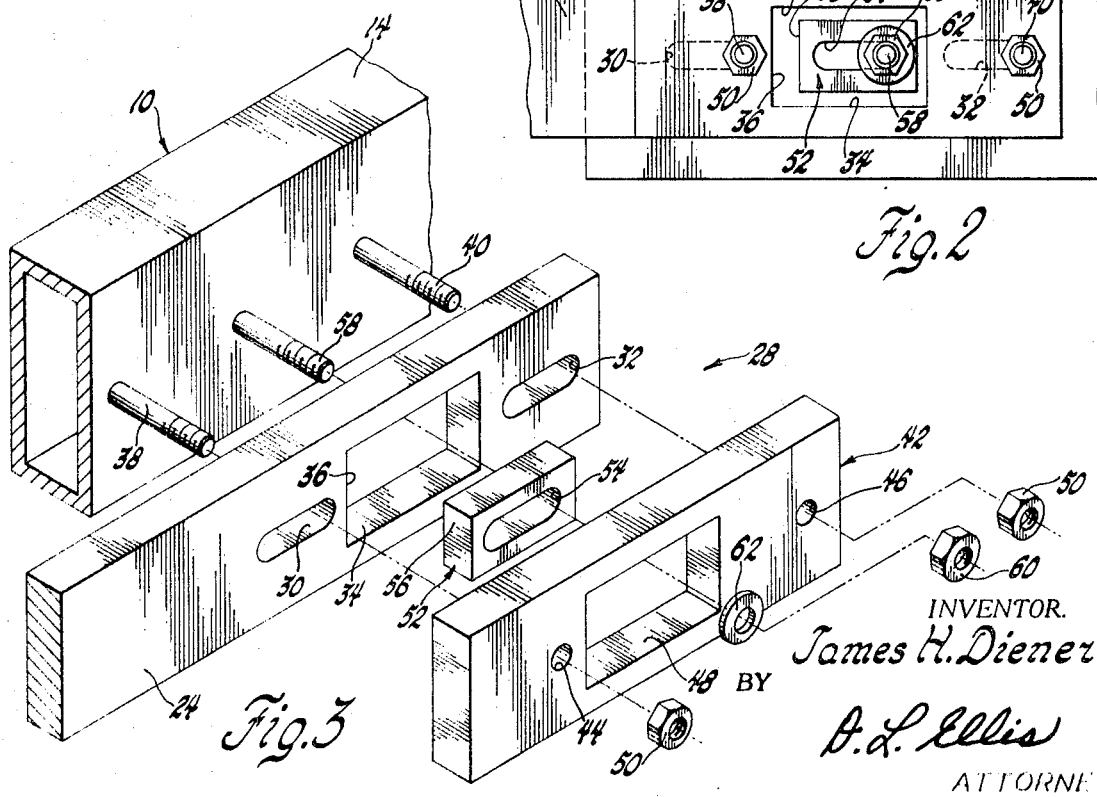
FIG. 3 is an exploded perspective view of an energy absorbing mount according to this invention.

Since both mounts 26 and 28 are identical in structure the following discussion is limited to a description of left mount 28, it being understood, of course, that both mounts function in an identical manner. Referring now to FIGS. 2 and 3, the left strut 24 projecting from the bumper bar includes a pair of longitudinally spaced slots 30 and 32 and an enlarged rectangular aperture 34 having a forward edge 36. Each slot 30 and 32 slidably receives the shank of a respective one of a pair of threaded studs 38 and 40, each stud being rigidly affixed to left frame rail 14 by conventional means, not shown. The studs 38 and 40 thus support the strut 24, and hence the bumper bar 20, on the chassis frame in cantilever fashion with the slots 30 and 32 permitting longitudinal bodily movement of the bumper structure relative to the chassis frame.

For normal operation of the vehicle, the bumper structure 18 is maintained in a rigid condition with respect to the chassis frame 10 by a primary energy absorbing unit including a friction pad 42. The friction pad 42 includes a pair of longitudinally spaced clearance holes 44 and 46 and a rectangular aperture 48 between the clearance holes. As seen best in FIG. 3, the holes 44 and 46 receive, respectively, studs 38 and 40, the studs thus functioning to support the friction pad on the chassis frame over the strut 24 for only a relative lateral movement. The friction pad 42 is restrained against lateral movement by a pair of nuts 50 threadedly received on respective ones of the studs 38 and 40.

The nuts 50, in addition to retaining the friction pad on the studs, are operative to place the strut 24 in compression between the frame rail 14 and the friction pad 42. When so compressed, substantial mechanical friction is generated between the strut and the frame rail and between the strut and friction pad which mechanical friction functions to resist relative bodily movement of the strut and bumper bar. Normally, the bumper structure is supported on the chassis frame in a fully extended position, FIG. 2, with rectangular apertures 34 and 48 in register and with the studs 38 and 40 situated at the rearward ends of slots 30 and 32, FIG. 2. In addition, the nuts 50 are normally tightened or torqued down on the studs 38 and 40 an amount sufficient to generate enough mechanical friction between the strut and frame rail and the strut and friction pad to successfully resist bodily movement of the bumper structure when the bumper bar 20 is subjected to impact forces of magnitude below a predetermined value. The predetermined value is purposely somewhat higher than magnitude of the most severe impact force which the bumper bar might be expected to experience during every day operation of the vehicle so that the bumper structure 18 is, in effect, normally rigidly supported on the chassis frame.

In an abnormal situation, as when a collision results in a rearwardly direction force of extraordinary magnitude on the bumper bar 20, the mount 42 yields first in a primary energy absorbing mode to absorb the energy of or cushion the impact. More particularly, when the magnitude of the extraordinary force exceeds the predetermined value the strut 24 is forced rearward relative to the frame rail and the friction pad against the uniform resistance of the mechanical friction. Accordingly, theenergy imparted to the bumper structure by the extraordinary force is absorbed at a relatively uniform rate and dissipated as heat as the entire bumper structure bodily moves rearward relative to the chassis frame.

Referring now to FIGS. 2 and 3, the energy absorbing mount 28 further includes a secondary energy absorbing unit, the secondary unit including a rectangular contact member 52 having a slot 54 therein and a front edge 56. The contact member 52 is slightly thinner than the strut 24 and substantially dimensionally smaller than the rectangular aperture 34 therein and the rectangular aperture 48 in the friction pad. The contact member 52 is introduced into the registered rectangular apertures 34 and 48 and brought into flush or abutting relation to the outboard side of frame rail 14, a third stud 58 rigidly affixed to the frame rail being slidably received within the slot 54 in the contact member so that the latter is longitudinally bodily movable relative to the frame rail. The contact member 52 is retained on the third stud 58 by a nut 60 and a large flat washer 62, the nut 60 also functioning when tightened down on the stud to clamp the contact member against the frame rail. When so clamped, substantial mechanical frictional resistance to relative bodily movement of the contact member is generated between the latter and the frame rail and flat washer.

For normal vehicle operation, the bumper structure 18 is secured by the nuts 50 and friction pad 42 as shown in FIG. 2. Similarly, as seen best in FIG. 2, the contact member 52 is normally positioned on the frame rail with the third stud 58 situated at the rearward end of slot 54 and with front edge 56 spaced a predetermined distance from leading edge 36 of the rectangular aperture in the strut, the contact member being normally rigidly maintained in such position by the mechanical friction generated by the nut 60.

As recited hereinbefore, a typical energy absorbing cycle of operation of the mount 28 begins when a force of extraordinary magnitude exerted on the bar 20 initiates rearward relative bodily movement of the bumper structure with corresponding primary energy absorption. After a predetermined amount of such relative bodily movement corresponding to the spacing between the leading edge 36 of the rectangular aperture 34 in the strut and the front edge 56 of the contact member, the former engages the latter so that any subsequent relative bodily movement of the bumper structure is accompanied by corresponding movement of the contact member relative to the chassis frame. Such movement of the contact member is, however, resisted by mechanical friction generated by nut 60. Accordingly, when engagement between the strut and contact member is achieved a finite increase in mechanical frictional resistance to relative bodily movement of the bumper structure is experienced by the latter so that for each unit of subsequent relative bodily movement of the bumper structure a finite or secondary increase in the amount of energy absorbed and dissipated as heat is effected, the secondary absorption also being at a relatively uniform rate due to the uniform resistance of the additional friction.

It will, of course, be apparent that after each energy absorbing cycle of operation the mount 28 can be reset in its normal condition merely by loosening nuts 50 and 60, manually moving the bumper structure and contact member to their original extended positions, FIG. 2, and retightening the nuts. It will be further apparent that the energy absorbing characteristics of the primary and secondary energy absorbing units can be varied as desired merely by increasing or decreasing the mechanical frictional resistance to movement, such increase or decrease being effected by tightening or loosening the nuts 50 and 60.

Having thus described the invention, what is claimed is:

1. In a vehicle, the combination comprising, means on said vehicle defining a flat surface, a collision bumper structure including a rigid strut having a pair of slots and a receiving aperture therein, a pair of rigid support members on said vehicle, each of said support members being received in a respective one of said slots to thereby mount said rigid strut on said vehicle for engagement on and for bodily movement relative to said flat surface, clamping means disposed between said vehicle and said strut for generating a primary force between said strut and said flat surface of predetermined magnitude and normal to said flat surface, said primary normal force generating a primary mechanical friction force beween said flat surface and said strut proportional in magnitude to the magnitude of said primary normal force and resisting relative bodily movement of said strut so that a portion of the kinetic energy of an extraordinary impact on said bumper structure is absorbed by bodily movement of said strut against the resistance of said primary friction force, a contact member, means supporting said contact member on said vehicle for engagement on and for bodily movement relative to said flat surface and within the confines of said receiving aperture, and means disposed between said vehicle and said contact member adapted for generating a secondary force between the latter and said flat surface of predetermined magnitude and normal to said flat surface, said secondary normal force generating a secondary mechanical friction force between said flat surface and said contact member proportional in magnitude to the magnitude of said secondary normal force and resisting bodily movement of said contact member relative to said flat surface, said contact member being predeterminedly smaller in size than said receiving aperture so that said strut and said bumper structure are bodily movable relative to said contact member and to said vehicle through a predetermined distance before an edge of said receiving aperture engages a corresponding edge of said contact member, said contact member thereafter being bodily movable as a unit with said strut relative to said vehicle and against said secondary friction force thereby to effect additional energy absorption.

* * * * *